United States Patent
Driskell et al.

(10) Patent No.: US 12,531,854 B2
(45) Date of Patent: Jan. 20, 2026

(54) CREDENTIALS SECURITY MANAGEMENT

(71) Applicant: The 20 LLC, Plano, TX (US)

(72) Inventors: Sage David Driskell, Allen, TX (US); Luke Matthew Glover, McKinney, TX (US)

(73) Assignee: THE 20 LLC, Plano, TX (US)

( * ) Notice: Subject to any disclaimer, the term of this patent is extended or adjusted under 35 U.S.C. 154(b) by 0 days.

(21) Appl. No.: 18/590,087

(22) Filed: Feb. 28, 2024

(65) Prior Publication Data

US 2024/0291811 A1    Aug. 29, 2024

Related U.S. Application Data

(60) Provisional application No. 63/487,459, filed on Feb. 28, 2023.

(51) Int. Cl.
*H04L 29/06* (2006.01)
*H04L 9/32* (2006.01)
*H04L 9/40* (2022.01)

(52) U.S. Cl.
CPC .......... *H04L 63/083* (2013.01); *H04L 9/3297* (2013.01)

(58) Field of Classification Search
None
See application file for complete search history.

(56) References Cited

U.S. PATENT DOCUMENTS

| | | | |
|---|---|---|---|
| 6,006,333 A | 12/1999 | Nielsen | |
| 7,428,750 B1 | 9/2008 | Dunn et al. | |
| 7,552,467 B2 | 6/2009 | Lindsay | |
| 7,657,639 B2 | 2/2010 | Hinton | |
| 9,557,889 B2 | 1/2017 | Raleigh et al. | |
| 9,954,867 B1 | 4/2018 | Johansson et al. | |
| 10,574,692 B2 | 2/2020 | Drake | |
| 10,846,390 B2 | 11/2020 | Subramanian et al. | |
| 11,552,936 B2 | 1/2023 | Call et al. | |
| 11,651,357 B2 | 5/2023 | Kumar et al. | |
| 11,777,992 B1 * | 10/2023 | Cross | H04L 63/0876 726/5 |
| 11,902,306 B1 * | 2/2024 | Satish | H04L 63/1425 |
| 11,954,238 B1 * | 4/2024 | Tan | H04L 9/0891 |
| 2005/0027713 A1 | 2/2005 | Cameron et al. | |
| 2011/0239278 A1 | 9/2011 | Downey et al. | |

(Continued)

OTHER PUBLICATIONS

Cheung, Herman et al. New smart-grid operation-based network access control. 2015 IEEE Energy Conversion Congress and Exposition (ECCE). https://ieeexplore.ieee.org/stamp/stamp.jsp?tp=&arnumber=7309828 (Year: 2015).*

(Continued)

*Primary Examiner* — Jeremiah L Avery
(74) *Attorney, Agent, or Firm* — Holzer Patel Drennan

(57) ABSTRACT

A credentials security system receives, from a requester computing system, a request for access to the specified computing system. The credentials security system returns, to the requester computing system responsive to receiving the request, credentials for an account present on the specified computing system. The credentials security system modifies, responsive to returning the credentials to the requester, the account on the specified computing system.

35 Claims, 7 Drawing Sheets

(56) References Cited

U.S. PATENT DOCUMENTS

| | | | |
|---|---|---|---|
| 2015/0033302 A1* | 1/2015 | Hitchcock | H04L 63/08 |
| | | | 726/5 |
| 2019/0050557 A1 | 2/2019 | Martin et al. | |
| 2022/0408268 A1* | 12/2022 | Johnston | H04W 12/06 |
| 2023/0030230 A1* | 2/2023 | Lyons | H04L 9/50 |
| 2023/0106024 A1* | 4/2023 | Keith, Jr. | G16H 40/63 |
| | | | 726/5 |
| 2023/0179421 A1* | 6/2023 | Rojas | H04L 63/08 |
| | | | 713/168 |
| 2023/0246822 A1* | 8/2023 | Everspaugh | H04L 9/50 |
| | | | 713/153 |
| 2023/0269086 A1* | 8/2023 | Schreck | H04L 9/3236 |
| | | | 713/168 |
| 2023/0421540 A1* | 12/2023 | Ocegueda | G06F 9/547 |
| 2024/0015035 A1* | 1/2024 | Stock | H04L 9/0894 |
| 2024/0146699 A1* | 5/2024 | Jayaraman | H04L 63/0861 |

OTHER PUBLICATIONS

Kagal, L. Trust-based security in pervasive computing environments. Computer, vol. 34, Issue: 12. https://ieeexplore.ieee.org/stamp/stamp.jsp?tp=&arnumber=970591 (Year: 2001).*

Nabeel, Mohamed; Bertino, Elisa. Privacy preserving delegated access control in the storage as a service model. 2012 IEEE 13th International Conference on Information Reuse & Integration (IRI). https://ieeexplore.ieee.org/stamp/stamp.jsp?tp=&arnumber=6303070 (Year: 2012).*

Coffee, Nicholas C., "Greenpass Client Tools for Delegated Authorization in Wireless Networks", Dartmouth College, Dartmouth Computer Science Department Technical Report TR2004-509, Jun. 3, 2004, 163 pages.

Metasys , "Metasys Release 11.0 Hardening Guide", Johnson Controls, GPS0028-CE-20020331-EN, Rev A, 2022, 55 pages.

* cited by examiner

CREDENTIALS SECURITY MANAGEMENT

CROSS-REFERENCE TO RELATED APPLICATION

This application claims priority to U.S. Provisional Application No. 63/487,459 entitled "Password Security Management" and filed on Feb. 28, 2023, the entire contents of which are incorporated herein by reference.

BACKGROUND

Credential management within an enterprise is complicated and risky. It is common for a computer support staff to install local administration accounts on each of the computers the staff supports in the enterprise in order to allow the staff to access each computer and perform support activities.

SUMMARY

In some aspects, the techniques described herein relate to a method of managing access to a specified computing system connected to a credentials security system via an external communication channel, the method including: receiving, by the password security computing system from a requester computing system, a request for access to the specified computing system; returning, by the password security computing system to the requester computing system responsive to receiving the request, credentials for an account present on the specified computing system; and modifying, by the password security computing system responsive to returning the credentials to the requester, the account on the specified computing system.

In some aspects, the techniques described herein relate to a computing system for managing access to a specified computing system, the computing system including: a virtual security assistant (VSA) system executable by one or more hardware processors, connected to the specified computing system via an external communication channel, and configured to: receive from a requester computing system, a request for access to the specified computing system; return, to the requester computing system, credentials for an account present on the specified computing system, responsive to receiving the request; and a password generation system executable by the one or more hardware processors and configured to modify the account on the specified computing system, responsive to returning the credentials to the requester.

In some aspects, the techniques described herein relate to one or more tangible processor-readable storage media embodied with instructions for executing on one or more processors and circuits of a computing device a process managing access to a specified computing system connected to a credentials security system via an external communication channel, the process including: receiving, from a requester computing system, a request for access to the specified computing system; returning, to the requester computing system, credentials for an account present on the specified computing system, responsive to receiving the request; and modifying the account on the specified computing system, responsive to returning the credentials to the requester computing system.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
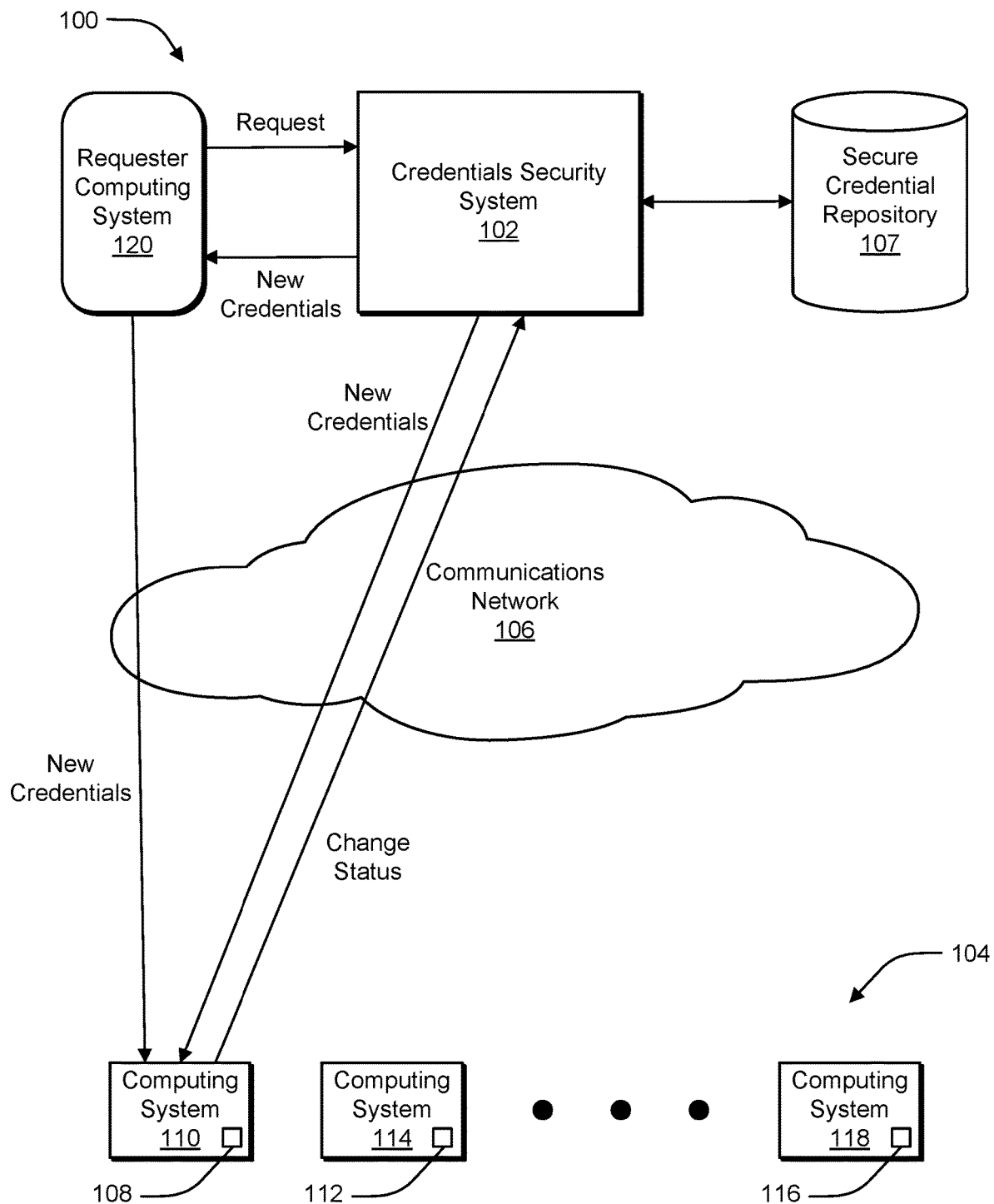
FIG. 1 illustrates an example system employing credentials security management using credential roll-overs.

The described technology is directed to addressing the risks, inconvenience, and lack of scalability of conventional methods of managing credentials. For instance, in conventional credential management systems, computer support organizations simply use the same administrative password for all of the computers in the enterprise, or even across multiple enterprises, which presents substantial security risks. In other scenarios, the staff maintains a list of passwords for local administration accounts in a password repository, such as a spreadsheet, a text file, or one or more pieces of paper. This conventional method of credential management is also very risky from a security perspective. Furthermore, multiple passwords (e.g., for individual computers or groups of computers) are complicated to manage and utilize, particularly at large scales. Such conventional credential management processes present understandable security concerns. For example, if many computers have the same administrative password, a support technician only needs to remember or look up one password to access any of the computers, which is uncomplicated and convenient. However, such conventional credential management processes expose all of the other computers of the enterprise to potentially unauthorized access by this single technician, especially if the technician changes jobs and the administrative passwords are not changed frequently. Further, the manual changing of administrative passwords in conventional credential management processes on many computers is time-consuming and fraught with the risk of errors (e.g., typos, forgotten or incorrectly recorded passwords).

Various aspects of the implementations described herein provide technical benefits over conventional password management systems. For example, the credentials security system described herein automatically manages credentials using policies, which reduces security risks over conventional credential management systems that rely on manual human intervention to update passwords. Further, the credentials security system described herein provides a centralized authority for managing credentials (and, more generally, for managing access to computing systems), in contrast to managing credentials at each supported computing system as performed in conventional password management systems. Accordingly, the credentials security system described herein can roll over passwords according to centralized policies, be responsive to system-detected triggers, and/or be triggered by centralized commands, which is not possible in conventional credential management systems. Rolling over passwords can include changing the password and also resetting permissions for a user associated with the password. Rolling over passwords, in some scenarios, can include setting up a new account for the user.

Generally, the credentials security system described herein automatically changes administrative credentials on a periodic basis and/or subject to certain trigger events and records the new passwords securely (e.g., with encryption). The new credentials generated by the credentials security system are not divulged to technicians or users until they are needed.

The following non-limiting example is provided to introduce certain implementations. The credentials security system receives, from a requester computing system via a network, a request for current credentials for a specified computing system. For example, to access a computer, a technician operating the requester computing system or requesting resources operating on the requester computing system requests the current credentials for the specified computing system from the credentials security system. The credentials security system receives the request, authenticates the requester or requesting resource, confirms that the requester or requesting resource is authorized to access the specified computing system, looks up the current credentials for the specified computing system, and transmits the current credentials to the requesting computer device (e.g., in free text or some other usable format). In this example, until the credentials are requested for access to the computing system, the credentials security system maintains the credentials securely and in confidence. After presenting the current credentials to the computing device associated with the authorized requester computing system, the credentials security system changes the credentials for the specified computing system according to one or more predefined policies (e.g., after 48 hours or other predetermined amount of time from the time at which the credentials were most recently requested, when the requester or requesting resource indicates that access to the specified computing system is no longer required, in response to a detected security concern such as a security threat or breach, or in accordance with one or more specified conditions). In some implementations, the credentials security system changes the credentials for the specified computing system responsive to receiving a request to change the credentials (e.g., a roll-over request). For example, the credentials security system receives the request to change the credentials from the requester computing system.

In some implementations, the credentials security system receives the request to change the credentials from the specified computing system. For example, the request to change the credentials can be initiated by an end user of or site administrator of the specified computing system. In some implementations, a dispatch system (e.g., an agent) is implemented and deployed to a domain or local environment for the specified computing system to allow the specified computing system to communicate roll-over requests to the credentials security system. For example, a user needs to have a process run with a limited set of administrative permissions that are not part of a set of standard permissions. In this example, the user requests, via the dispatch system, an account and provides the account to an automation process or a vendor in a secure environment to prevent wholesale access via some local mechanism. In another example, a technician of the specified computing system needs to install an application but also has confidential data that requires security measures to prevent access for a standard tech. In this example, the dispatch system provisions a separate account with permissions to install applications but not access the protected data. In these examples, the dispatch system provides a quick local event with no tracking or interface with a credentials security system for logging or security change tracking. In some implementations, the dispatch system can display, on the specified computing system responsive to receiving the roll-over request, a user interface (e.g., a pop-up window) with the credentials for the user to provide to the technician or for them to write down/print for temporary usage if they have to log out and back in with the new account. In some scenarios, the user may even have an option to deactivate via an object on the user interface (e.g., clicking a button) when the work of the technician on the specified computing system is complete.

After the credentials security system changes the credentials in accordance with the one or more predefined policies, the circumstances for credentials request and retrieval return to a state similar to circumstances that existed before the credentials request. For example, the credentials security system securely stores the new password, which remains unknown to technicians, users, or other operators or requesting resources until requested from the credentials security system at a subsequent time. In some implementations, the credentials security system can, in some instances, prevent a user possessing the new credentials for the account on the computing system from changing the credentials or creating a new admin account on the computing system. Furthermore, the credentials security system can log requests for new credentials and account creations and transmit an alert to security monitoring systems within the enterprise upon an occurrence of malicious or inadvertently risky actions that trigger the alert.

In certain implementations, the credentials security system can manage access using temporary accounts. For example, as part of a roll-over of credentials, rather than just changing and providing credentials to a requesting computer device, the credentials security system can set up the temporary user (e.g., administrator) accounts in a specified computing system responsive to receiving a request from the computing device. In this manner, rather than providing a requester computing system with full administrator access privileges, the credentials security system can use its full administrator account to create a temporary user account having custom privileges. The credentials security system can present credentials (e.g., login and password) for the temporary user account to the requesting computer device for temporary access initiated by the requester to the computing system. In some instances, the credentials security system creates the temporary account responsive to receiving a request for access initiated by a requester via the requesting computer device. In some implementations, the credentials security system creates the temporary account in anticipation of receiving a future request initiated by a future requester computing system.

In various implementations, the described technology automates secure credential practices by maintaining a uniqueness of credentials across multiple computing systems supported by a credentials security system at any given time. Furthermore, the credentials security system can also enforce other credential policies, such as password length; required combinations of upper/lower case letters, numbers, and special characters; non-repeating characters; and other strong credential constraints by generating its own credentials that comply with such policies. In some implementations, the credentials comprise one or more of user identifiers, passwords, passcodes, passkeys, one-time-passwords, biometric data, non-fungible tokens (NFTs), or other credentials.

Various aspects of the described technology provide technical benefits over conventional credential management systems, such as automating the management of credentials using policies rather than relying on manual human intervention, which reduces security risks posed by conventional credential management systems. The described technology also provides a centralized authority for managing credentials (and, more generally, for managing access to computing systems), in contrast to conventional credential management systems' management of credentials at each supported computing system. Accordingly, the credentials security system described herein can roll over (e.g., change) credentials according to centralized policies, be responsive to system-detected triggers, and/or be triggered by centralized commands.

Such benefits provided by the described technology do not depend on whether the computing systems for which users request credentials are within the same domain, are within the same workgroup, or are stand-alone. The credentials security system described herein can manage stand-alone or affiliated computing systems, independent of any enterprise or networking relationships among the systems, which may or may not be present.

FIG. 1 illustrates an example system 100 employing credentials security management using credential roll-overs. As depicted in FIG. 1, a credentials security system 102 is communicatively coupled to multiple computing systems (e.g., computing system 110, computing system 114, computing system 118) via a communications network 106 (e.g., a communication channel that is external to the credentials security system and the computing systems. The credentials security system 102 is also communicatively coupled to a secure credential repository 107, which stores credentials for one or more accounts present on each of the computing systems. In some implementations, the credentials comprise one or more of user identifiers, passwords, passcodes, passkeys, one-time-passwords, biometric data, non-fungible tokens (NFTs), or other credentials.

In certain implementations, a credentials security system agent (see, e.g., credentials security system agent 108, credentials security system agent 112, and credentials security system agent 116 depicted in FIG. 1) is installed and executing on each of the computing systems to coordinate communications between the credentials security system 102 and the computing system. For example, a credentials security system agent 108 is installed on a computing system 110, a credentials security system agent 112 is installed on a computing system 114, and a credentials security system agent 116 is installed on a computing system 118. For example, the credentials security system agent 108 receives an instruction to change current credentials on the computing system 110 to new credentials, passes the instructions through application programming interfaces (APIs) of the computing system 110 to change the credentials, and returns a change status to the credentials security system 102. If the change status indicates that the credentials change was successful, the credentials security system 102 associates the new credentials with the identity of the computing system 110 and records the new credentials in the secure credential repository 107. If the change status indicates that the credentials change was successful, the credentials security system 102 leaves the current credentials unchanged in the secure credential repository 107 in association with the identity of the computing system 110 and, in some instances, attempts to modify the credentials of the computing system 110 again.

The credentials security system 102 is accessible by a requester computing system 120 operated by a requester. For example, the requester can be a computer support technician or user. If the requester wishes to access an account on the computing system 110 using the requester computing system 120, the new credentials required to gain access to the account are stored in the secure credential repository 107 and are unknown to the requester. Accordingly, responsive to receiving one or more inputs of the requester, the requester computing system 120 requests the new credentials from the credentials security system 102, which authenticates the requester, determines whether the requester is authorized to receive the new credentials and, if so, extracts the new credentials from the secure credential repository 107 and securely passes them to the requester computing system 120. Thereafter, the requester can use the new credentials to access, using the requester computing system 120 or using another computing device, the account on the computing system 110.

In some instances, the credentials security system 102 can limit the utility of the new credentials to the requester. In one implementation, the credentials security system 102 can schedule a modification of the account's credentials after a predesignated period of time (e.g., 48 hours) to give the requester time to access the account and perform whatever authorized functions are needed on the computing system 110. In another implementation, the credentials security system 102 can trigger a modification of the account's credentials, such as after an associated support ticket is closed, responsive to an instruction sent to the credentials security system 102, subject to other policies followed by the credentials security system 102, or in accordance with another one or more predefined conditions. At the time or after the credentials security system 102 executes the modification of the credentials, the credentials security system 102 sends new credentials to the computing system 110, evaluates the returned change status, and records the new credentials in the secure credential repository 107 if the modification was successful. The credentials security system 102, in some instances, awaits a subsequent request for credentials from a requester.

Figure 2:
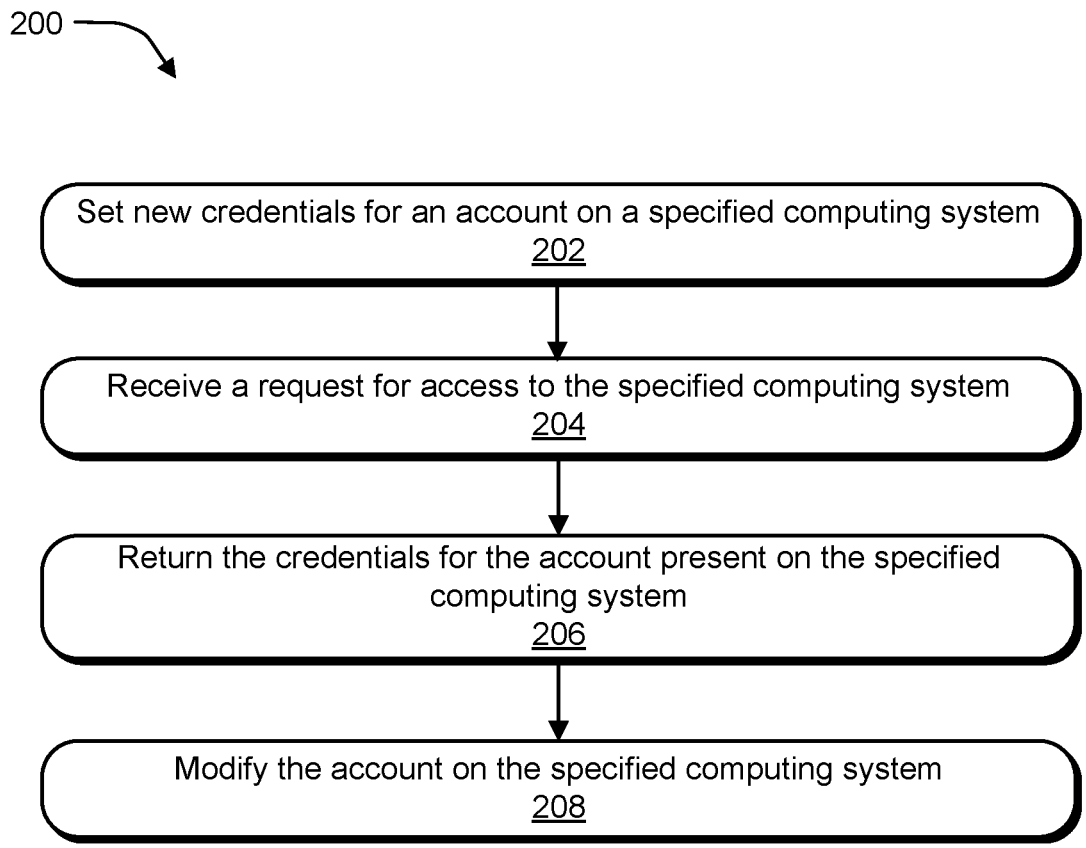
FIG. 2 illustrates example operations for performing credentials security management using credential roll-overs.

FIG. 2 illustrates example operations 200 for performing credentials security management using credential roll-overs. One or more computing devices (e.g., the credentials security system or individual subsystems contained therein) implement operations depicted in FIG. 2. For illustrative purposes, the operations 200 are described with reference to certain examples depicted in the figures. Other implementations, however, are possible.

A roll-over operation 202 sets new credentials for an account on a specified computing system. In some instances, the new credentials include a sequence of alphanumeric and/or symbolic characters, a digital signature, code, or other data. In some implementations, the new credentials comprise one or more of user identifiers, passwords, passcodes, passkeys, one-time-passwords, biometric data, non-fungible tokens (NFTs), or other credentials. Setting the new credentials can include using a random number generator or other algorithm to generate the new credentials and associating (e.g., in a secure credential repository) the new credentials with the account. Setting the new credentials can also include encrypting the new credentials. In some instances, the account is associated with a requester who can request, via a requester computing system, access to the specified computing system. The specified computing system can provide services to the requester computing system upon successful access by the requester. For instance, the specified computing system can be a data storage system, an email or messaging system, a logistics system, or another computing system that provides services to one or more accounts, and the requester accesses the services via the requester computing system.

A receiving operation 204 receives a request, from a requester computing system, for access to the specified computing system. In certain implementations, the requester accesses a stand-alone or web browser application associated with the specified computing system and requests, using the application, one or more services of the specified computing system. The requester may be a technician or user operating the requester computing system and associated with the account. The application associated with the specified communication system on the requester computing system communicates the request via a network, and the receiving operation 204 includes receiving the request from the application. In certain implementations, the requester computing system includes a credentials security application that communicates via a network with the credentials security system. For example, the requester accesses an application associated with the credentials security system (e.g., a credentials security application operating on the requester computing system) and initiates a request for access to the specified computing system using the credentials security application and the receiving operation 204 includes receiving the request from the credentials security application operating on the requester computing system.

A returning operation 206 returns the new credentials for the account to the requester computing system. In some implementations, the returning operation 206 includes authenticating the requester, confirming that the requester is authorized to access the specified computing system, looking up the new credentials for the specified computing system, and transmitting the new credentials to the requester computing system. In some implementations, the returning operation 206 includes transmitting, via the network via another network or another mode of communication (e.g., text message, email), the new credentials to the requester computing system. For example, the requester computing system receives the new credentials, and the requester initiates a request, using the requester computing system, with the specified computing system and provides, in the request, the new credentials to the specified computing system, which provides or otherwise grants access to its services upon validation of the new credentials. In some implementations, the returning operation 206 includes forwarding the new credentials via the network to the specified computing system, which communicates with the requester computing system to provide one or more services upon validation of the new credentials.

A modification operation 208 changes the credentials for the account upon the occurrence of one or more predefined conditions. For example, the one or more predefined conditions or occurrences include one or more of a passage of a predesignated period of time after the generation of the new credentials or occurrence of one or more predefined events, occurrence of one or more events defined by a policy, a system-detected trigger, a centralized command, or other predefined condition or occurrence. In certain implementations, an operator of the credentials security system defines a set of one or more predefined conditions associated with one or more of the specified computing systems, the requester, or the requester computing system. In an example, one or more predefined policies mandate a change in the new credentials after 48 hours from the time at which the new credentials were most recently requested, when the requester indicates that access to the specified computing system is no longer required, in response to a detected security concern such as a security threat or breach, or in accordance with one or more conditions specified in another predefined policy.

Figure 3:
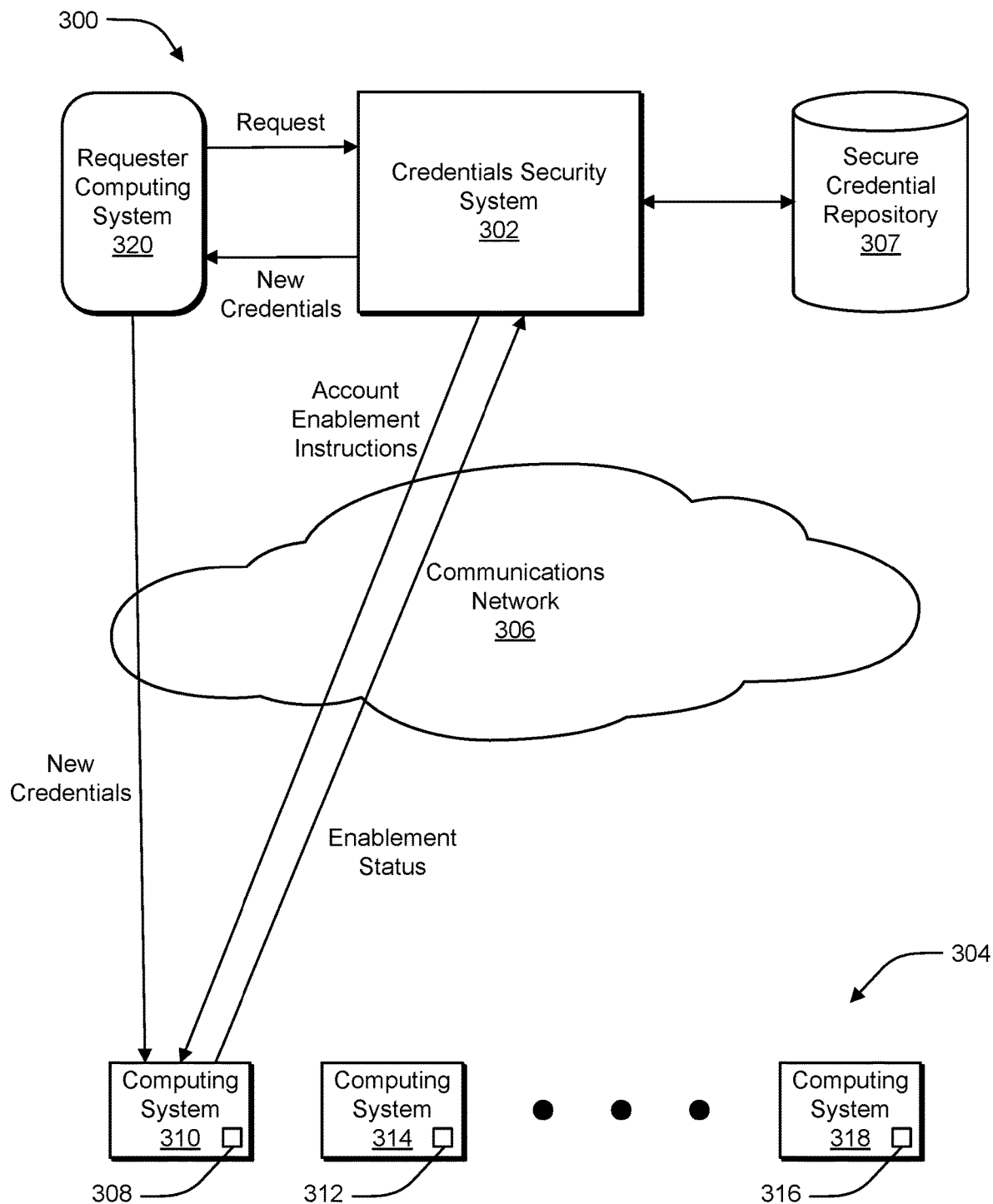
FIG. 3 illustrates an example system employing credentials security management using temporary user accounts.

FIG. 3 illustrates an example system 300 employing credentials security management using temporary user accounts. A credentials security system 302 is communicatively coupled to multiple computing systems (e.g., computing system 310, computing system 314, computing system 318) via a communications network 306 (e.g., a communication channel that is external to the credentials security system and the computing systems 304). The credentials security system 302 is also communicatively coupled to a secure credential repository 307, which stores credentials (e.g., including account names and passwords) for one or more accounts associated with each of the computing systems. In some implementations, the credentials comprise one or more of user identifiers, passwords, passcodes, passkeys, one-time-passwords, biometric data, non-fungible tokens (NFTs), or other credentials The credentials security system 302 is accessible by a requester using a requester computing system 320. For example, the requester is a computer support technician or user. If the requester wishes to access, using the requester computing system 320, an account on the computing system 310, the credentials security system 302 can create a new account on the computing system 310 with new credentials or, alternatively, enable an existing account on the computing system 310 with new credentials. The new credentials required to gain access to the account are stored in the secure credential repository 307 and are unknown to the requester. Accordingly, the requester, using the requester computing system 320, requests access to an account on the computing system 310 from the credentials security system 302, which authenticates the requester, determines whether the requester is authorized to access an account on the computing system 310, and if so, issues account enablement instructions to the computing system 310, stores account information, including the new credentials in the secure credential repository 307 and securely passes the new credentials to the requester computing system 320. Thereafter, the requester can use the new credentials to access, using the requester computing system 320 or another computing device, the newly enabled account on the computing system 310.

In certain implementations, a credentials security system agent is installed and executing on each of the computing systems to coordinate communications between the credentials security system 302 and the computing system. For example, a credentials security system agent 308 is installed on a computing system 310, a credentials security system agent 312 is installed on a computing system 314, and a credentials security system agent 316 is installed on a computing system 318. For example, the credentials security system agent 308 receives, from the requester computing system 320, a request for access to an account on the computing system 310, passes one or more account enablement instructions to enable an account on the computing system 310 through application programming interfaces (APIs) of the computing system 310 to enable the account (e.g., including to create the account), and returns an enablement status to the credentials security system 302. If the enablement status indicates that the account enablement was successful, the credentials security system 302 records the account information of the enabled account, including the account credential, in the secure credential repository 307 in association with the identity of the computing system 310. If the enablement status indicates that the account enablement was unsuccessful, the credentials security system 302, in some instances, does not alter the contents of the secure credential repository 307. In some instances, when the enablement status indicates that the account enablement was unsuccessful, the credentials security system 302 attempts to enable an account of the computing system 310 another time.

In some implementations, the credentials security system 302 limits the utility of the new credentials to the requester. In one implementation, the credentials security system 302 can schedule a disablement of the account after a predesignated period of time (e.g., 48 hours or another predefined time period) to give the requester time to access the account and perform whatever authorized functions are needed on the computing system 310. In one implementation, the credentials security system 302 can trigger a disablement of the account responsive to an occurrence of one or more conditions, such as after an associated support ticket is closed, responsive to an instruction sent to the credentials security system 302, subject to other policies followed by the credentials security system 302, etc. When the new modification is executed, the credentials security system 302 sends account enablement instructions to the computing system 310, evaluates the returned enablement status, and records the new credentials in the secure credential repository 307 if the enablement was successful.

Figure 4:
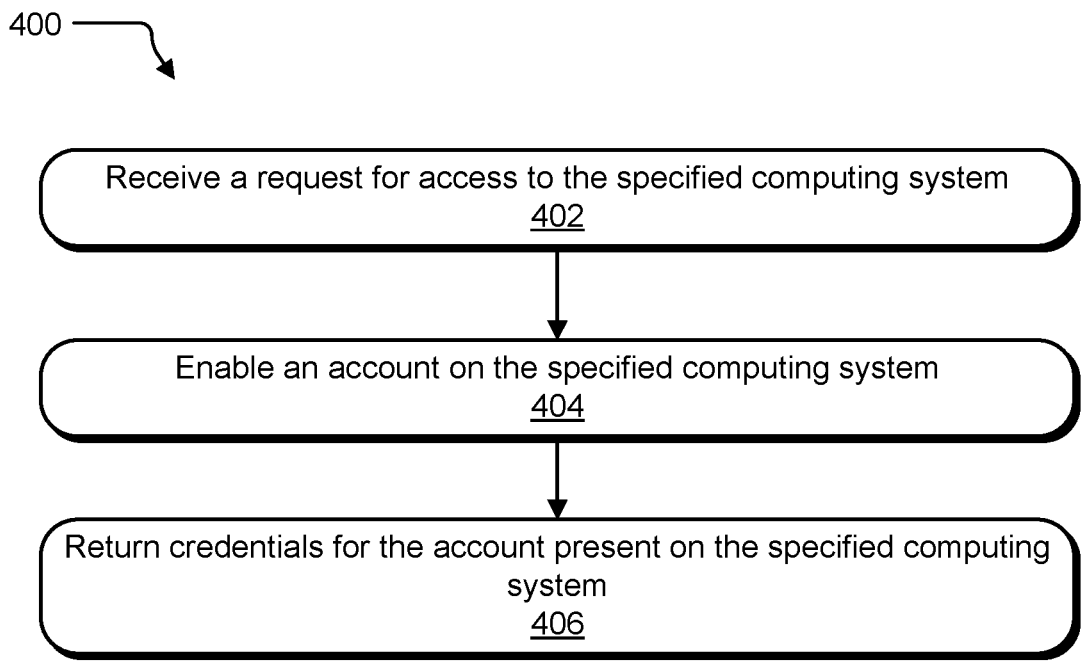
FIG. 4 illustrates example operations for performing credentials security management using enablement/disablement of a user account.

FIG. 4 illustrates example operations 400 for performing credentials security management using enablement/disablement of a user account. A receiving operation 402 receives a request, from a requester computing system, for access to the specified computing system. In certain implementations, the requester accesses a stand-alone or web browser application on the requester computing system that is associated with the specified computing system and requests, using the application, one or more services of the specified computing system. The requester may be a technician or user operating the requester computing system and associated with the account. The application associated with the specified communication system on the requester computing system communicates the request via a network, and the receiving operation 402 includes receiving the request from the application. In certain implementations, the requester computing system includes a credentials security application that communicates via a network with the credentials security system. For example, the requester accesses an application associated with the credentials security system (e.g., a credentials security application operating on the requester computing system) and initiates a request for access to the specified computing system using the credentials security application and the receiving operation 402 includes receiving the request from the credentials security application operating on the requester computing system.

A modification operation 404 enables an account on the specified computing system. For example, performing the modification operation 404 includes sending account enablement instructions to the computing system, evaluating a returned enablement status, and recording the new credentials in the secure credential repository if the enablement was successful. In some implementations, enablement of the account can be temporary, such that the account, after it is enabled during the modification operation 404, is disabled (e.g., deleted) responsive to one or more of the following: passage of a predesignated period of time, in accordance with a policy, responsive to a system-detected trigger, or via a centralized command.

A returning operation 406 returns the new credentials for the enabled account to the requester computing system. In some implementations, the returning operation 406 includes authenticating the requester, confirming that the requester is authorized to access the specified computing system, looking up the new credentials for the specified computing system, and transmitting the new credentials to the requester computing system. In some implementations, the credentials comprise one or more of user identifiers, passwords, passcodes, passkeys, one-time-passwords, biometric data, non-fungible tokens (NFTs), or other credentials. In some implementations, the returning operation 406 includes transmitting, via the network via another network or another mode of communication (e.g., text message, email), the new credentials to the requester computing system. For example, the requester computing system receives the new credentials, and the requester initiates a request, using the requester computing system, with the specified computing system and provides, in the request, the new credentials to the specified computing system, which provides or otherwise grants access to its services upon validation of the new credentials. In some implementations, the returning operation 406 includes forwarding the new credentials via the network to the specified computing system, which communicates with the requester computing system to provide one or more services upon validation of the new credentials.

Figure 5:
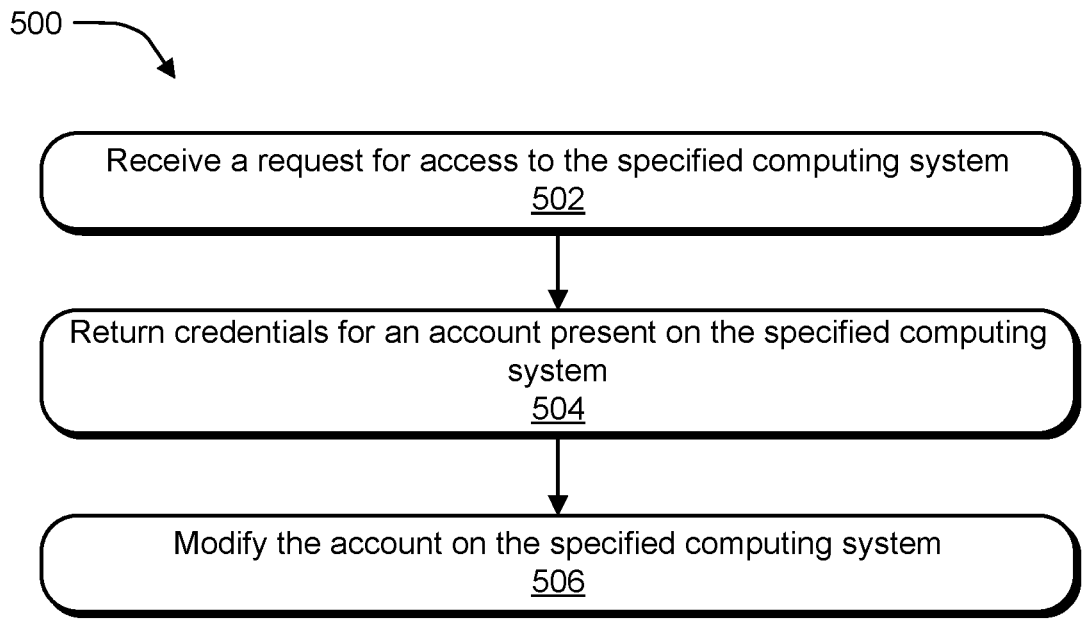
FIG. 5 illustrates example operations for performing credentials security management.

FIG. 5 illustrates example operations 500 for performing credentials security management. A credentials security system manages access to a specified computing system connected to the credentials security system via an external communication channel (e.g., communications network).

A receiving operation 502 receives, from a requester computing system, a request for access to the specified computing system. In certain implementations, the requester accesses a stand-alone or web browser application on the requester computing system that is associated with the specified computing system and requests, using the application, one or more services of the specified computing system. The requester may be a technician or user operating the requester computing system and associated with the account. The application associated with the specified communication system on the requester computing system communicates the request via a network, and the receiving operation 502 includes receiving the request from the application. In certain implementations, the requester computing system includes a credentials security application that communicates via a network with the credentials security system. For example, the requester accesses an application associated with the credentials security system and initiates a request for access to the specified computing system using the credentials security application, and the receiving operation 502 includes receiving the request from the credentials security application operating on the requester computing system.

A returning operation 504 returns, to the requester computing system, new credentials for an account present on the specified computing system, responsive to receiving the request. In some implementations, the returning operation 504 includes authenticating the requester, confirming that the requester is authorized to access the specified computing system, looking up the new credentials for the specified computing system, and transmitting the new credentials to the requester computing system. In some implementations, the returning operation 504 includes transmitting, via the network via another network or another mode of communication (e.g., text message, email), the new credentials to the requester computing system. For example, the requester computing system receives the new credentials, and the requester initiates a request, using the requester computing system, with the specified computing system and provides, in the request, the new credentials to the specified computing system, which provides or otherwise grants access to its services upon validation of the new credentials. In some implementations, the returning operation 504 includes forwarding the new credentials via the network to the specified computing system, which communicates with the requester computing system to provide one or more services upon validation of the new credentials. In some implementations, the new credentials comprise one or more of user identifiers, passwords, passcodes, passkeys, one-time-passwords, biometric data, non-fungible tokens (NFTs), or other new credentials.

A modification operation 506 modifies the account on the specified computing system, responsive to returning the new credentials to the requester computing system. For example, performing the modification operation 506 includes sending account enablement instructions to the computing system, evaluating a returned enablement status, and recording the new credentials in the secure credential repository if the enablement was successful. In some instances, enablement of the account can be temporary, such that the account, after it is enabled during the modification operation 506, is disabled (e.g., deleted) responsive to one or more of the following: passage of a predesignated period of time, in accordance with a policy, responsive to a system-detected trigger, or via a centralized command.

Figure 6:
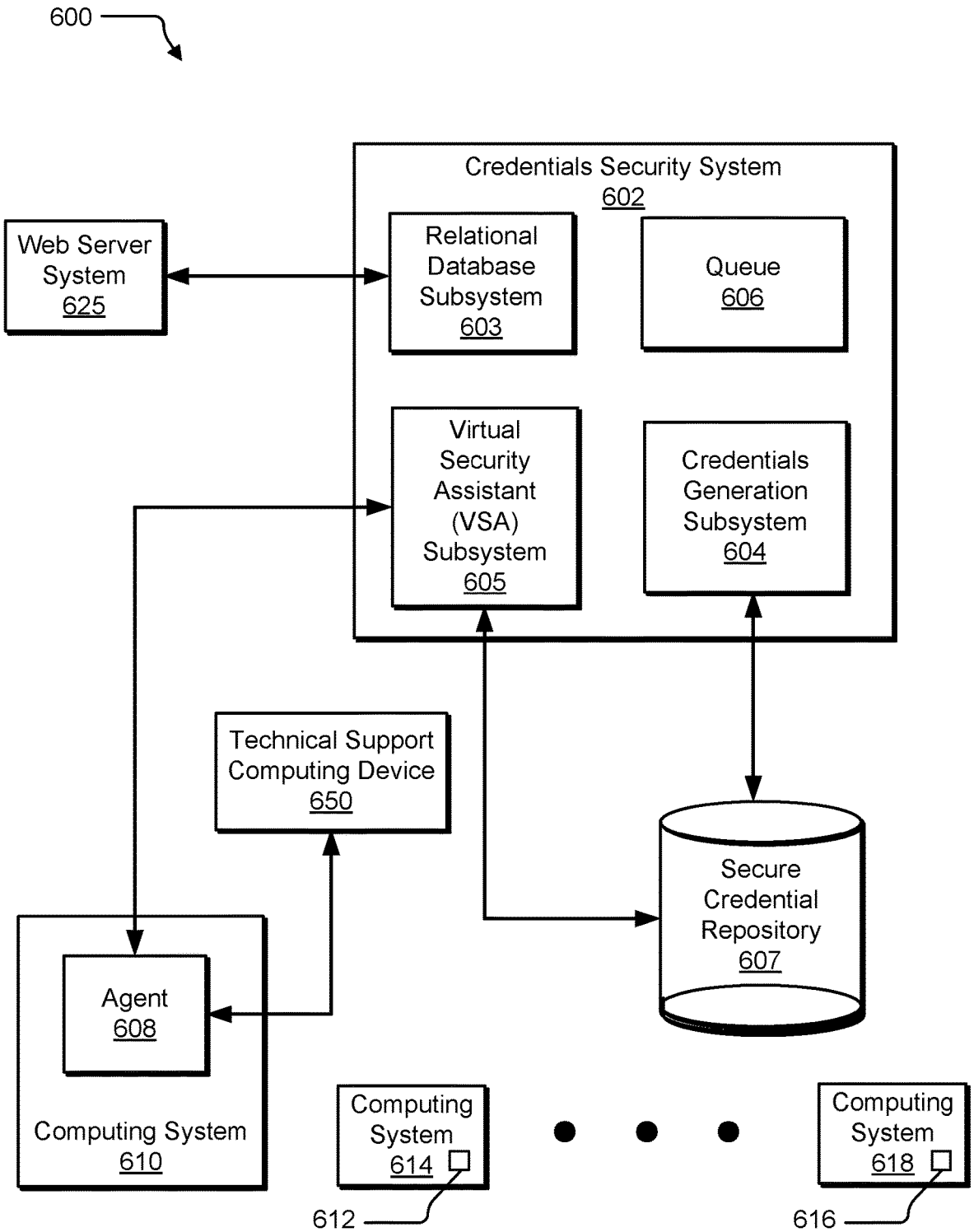
FIG. 6 illustrates an example system employing credentials security management.

FIG. 6 illustrates an example computing environment 600 employing credentials security management. A credentials security system 602 is communicatively coupled to multiple computing systems (e.g., computing system 610, computing system 614, . . . computing system 618) via a communications network. The credentials security system 602 is also communicatively coupled to a secure credential repository 607, which stores credentials (e.g., including account names and credentials) for one or more accounts associated with each of the computing systems (e.g., computing system 610, computing system 614, . . . computing system 618). The credentials security system 602 is also communicatively coupled to one or more web server systems (e.g., web server system 625) via the communications network. In one implementation, the credentials security system 602 includes a relational database subsystem 603, a credentials generation subsystem 604, a virtual security assistant (VSA) subsystem 605, and a queue 606.

In certain implementations, the credentials security system 602 communicates with one or more web server systems (e.g., web server system 625). In some instances, a web server system 625 can unmask a user's credentials, which involves decrypting the credentials to reveal decrypted credentials. In some instances, the web server system 625 connects to the relational database subsystem 603, requests the user credentials, receives the user credentials, and decrypts the user credentials. For example, the web server system 625 is a banking system, and a user of the banking system requests access to account data, which results in unmasking of the user's credentials. In some implementations, the web server system 625 connects to the relational database subsystem 603 and requests a given credential when a technician or other end user uses the technical support computing device 650 to unmask credentials. For example, the technician uses the user computer's web browser to access a website hosted by the web server system 625, which filters access to the data contained in the credentials security system 602. The web server system 625 negotiates a secure connection to the credentials security system 602 so that the relational database subsystem 603 may serve an unencrypted record to the web server system 625 per scoping. In some scenarios, the transmission of this record is encrypted, but the unmasking is a database decryption of the record that is then transmitted via a secure channel in a manner that the web server system 625 can interpret, for example, using standard encrypted database operations and standard secure transmission like HTTPS. The web server system 625 handles the presentation and scoping for the credentials security system 602. The website is presented by web server system 625 to the technical support computing device 650, and the web server system 625 is intermediary with the credentials security system 602 to make sense and restrict/present data from the relational database subsystem 603 of the credentials security system 602 and. In other words, the credentials security system 602 shapes which data of the relational database subsystem 603 is accessible to the web server system 625. In some implementations, the web server system 625 could be scoped so individual agents (e.g., credentials security system agent 608) can only see a subset of the data or be restricted in the type of account in a future version. In some scenarios, the web server system 625 may functionally require 100% access to the relational database subsystem 603 of the credentials security system 602, but a technician/agent may require potential access to less than 100% of the data contained within (e.g., only requiring access to a single record per singular transaction). Accordingly, in such scenarios, the technician only needs to know if credentials data does or does not exist to decide which singular transaction needs to be made. In some scenarios, a technician needs to know 100% of the accounts available for a task but only needs to unmask an individual set of data per usage, which is recorded and processed accordingly by the credentials security system 602.

In certain implementations, a credentials security system agent 608 is installed and executed on a computing system to coordinate communications between the VSA subsystem 605 of the credentials security system 602 and the computing system. In certain implementations, a respective credentials security system agent is installed on each of multiple computing systems. For example, credentials security system agent 608 is installed on computing system 610, credentials security system agent 612 is installed on computing system 614, and credentials security system agent 616 is installed on computing system 618. The example of FIG. 6 depicts three example computing systems (computing system 610, computing system 614, computing system 618). In some implementations, the computing environment 600 includes one, two, four, or another number of specified computing systems, each of the specified computing systems having a respective installed credentials security system agent. In some implementations, the credentials security system agent (e.g., credentials security system agent 608, credentials security system agent 612, credentials security system agent 616) can communicate with a technical support computing device 650, which can be granted access to the computing system (e.g., computing system 610, computing system 614, computing system 618) by the credentials security system agent to perform one or more technical support operations on the computing system 610. For example, the credentials security system agent 608 receives, from the technical support computing device 650, a request for access to an account on the computing system 610, passes one or more account enablement instructions to enable an account on the computing system 610 through application programming interfaces (APIs) of the computing system 610 to enable the account (e.g., including to create the account), and returns an enablement status to the VSA subsystem 605. If the enablement status indicates that the account enablement was successful, the credentials security system 602 records the account information of the enabled account, including the account credential, in the secure credential repository 307 in association with the identity of the computing system 610. If the enablement status indicates that the account enablement was unsuccessful, the credentials security system 602, in some instances, does not alter the contents of the secure credential repository 607. In some instances, when the enablement status indicates that the account enablement was unsuccessful, the credentials security system 602 attempts to enable an account of the computing system 610 another time.

The relational database subsystem 603 includes a list of every credentials security system agent (e.g., credentials security system agent 608, credentials security system agent 612, credentials security system agent 616) resident on its respective computing system (e.g., computing system 610, computing system 614, computing system 618). The relational database subsystem 603 can monitor interactions of one or more web server systems (e.g., web server system 625) with the credentials security system 602 and can detect an unmasking of the credentials by the web server system 625 or other predefined interaction and add a user identifier identifying a user associated with the credentials to the queue 606. For example, the relational database subsystem 603 detects an unmasking of user credentials by the web server system 625 and determines a time at which the unmasking occurs or a time at which the relational database subsystem 603 detected the unmasking. In some implementations, the user credentials comprise one or more of user identifiers, passwords, passcodes, passkeys, one-time-passwords, biometric data, non-fungible tokens (NFTs), or other credentials. In some implementations, the relational database subsystem 603 logs a time stamp responsive to the detection that indicates the time of the unmasking or a time of detection of the unmasking and adds a user identifier associated with the credentials and a time associated with the time stamp to the queue 606 for generation of new credentials. For example, the time stamp includes one or more of a year, a month, a day of a month, an hour, a minute, a second, a portion of a second, a time zone, or other information indicating a time associated with the unmasking or a time associated with the detection of the unmasking. In some implementations, the relational database subsystem 603 can detect types of web server system 625 interactions associated with a set of predefined events and can log the interaction and, responsive to logging the interaction associated with a predefined event, add the user to the queue 606. For example, the predefined events can include one or more of unmasking of the credentials by a web server system 625 or other computing system, expiration of a predefined time period (e.g., 30 days, 21 days, two months, or other predefined time period) after an initial creation of the credentials, or detection of a new user account that has not yet been provisioned with credentials. The predefined time period can be configured, in some implementations, by an operator of the credentials security system 602. In some implementations, as depicted in FIG. 6, the queue 606 is a component of the credentials generation subsystem 604 or a component of the relational database subsystem 603. In some implementations, the queue 606 is separate from the credentials generation subsystem 604 and the relational database subsystem 603 but is accessible by the credentials generation subsystem 604 and the relational database subsystem 603.

The queue 606 is used by the credentials generation subsystem 604 to determine when to generate new credentials for users that are within the queue 606. In some implementations, the credentials generation subsystem 604 generates new credentials for a user after a user identifier indicating the user has been in the queue 606 for a predefined amount of time (for example, 48 hours, 24 hours, five minutes, 21 days, or another predefined amount of time). In some implementations, an operator of the credentials security system 602 can configure the predefined amount of time. The predefined amount of time can be based on a type of event, for example, the predefined amount of time for generating new credentials for unmasked credentials may be 48 hours, and the predefined amount of time for generating new credentials after the creation of credentials may be 21 days. Increasing the predefined amount of time may result in less consumption of computing resources by the credentials security system 602 because the credentials will require change less often but may increase the chance of unauthorized use of the unmasked credentials. Decreasing the predefined amount of time may decrease the chance of unauthorized use of the unmasked credentials by requiring more frequent changes in the credentials but may consequently increase the consumption of computing resources by the credentials security system 602. In some implementations, the new credentials comprise one or more of user identifiers, passwords, passcodes, passkeys, one-time-passwords, biometric data, non-fungible tokens (NFTs), or other credentials. The credentials generation subsystem 604 notifies the VSA subsystem 605 of the generation of the new credentials, and the VSA activates a credentials security system agent 608 on a computing system 110 to which the new credentials provide access. The credentials generation subsystem 604 notifies the relational database subsystem 603 of the generation of the new credentials for the user. The credentials generation subsystem 604 stores the new credentials in the secure credential repository 607 in association with a user identifier identifying the user associated with the new credentials. The secure credential repository 607 is accessible to the relational database subsystem 603 and to the VSA subsystem 605.

In some implementations, the VSA subsystem 605 limits the utility of the new credentials to a requester, for example, a technical support computing device 650 providing technical assistance to the computing system 610 via the communications network. In one implementation, the VSA subsystem 605 can schedule a disablement of the account after a predesignated period of time (e.g., 48 hours or another predefined time period) to give the requester time to access the account and perform whatever authorized functions are needed on the computing system 610. In one implementation, the VSA subsystem 605 can trigger a disablement of the account responsive to an occurrence of one or more conditions, such as after an associated support ticket is closed, responsive to an instruction sent to the credentials security system 602, subject to other policies followed by the credentials security system 602, etc. When the new modification is executed, the VSA subsystem 605 sends account enablement instructions to the computing system 610, evaluates the returned enablement status, and records the new credentials in the secure credential repository 607 if the enablement was successful.

Figure 7:
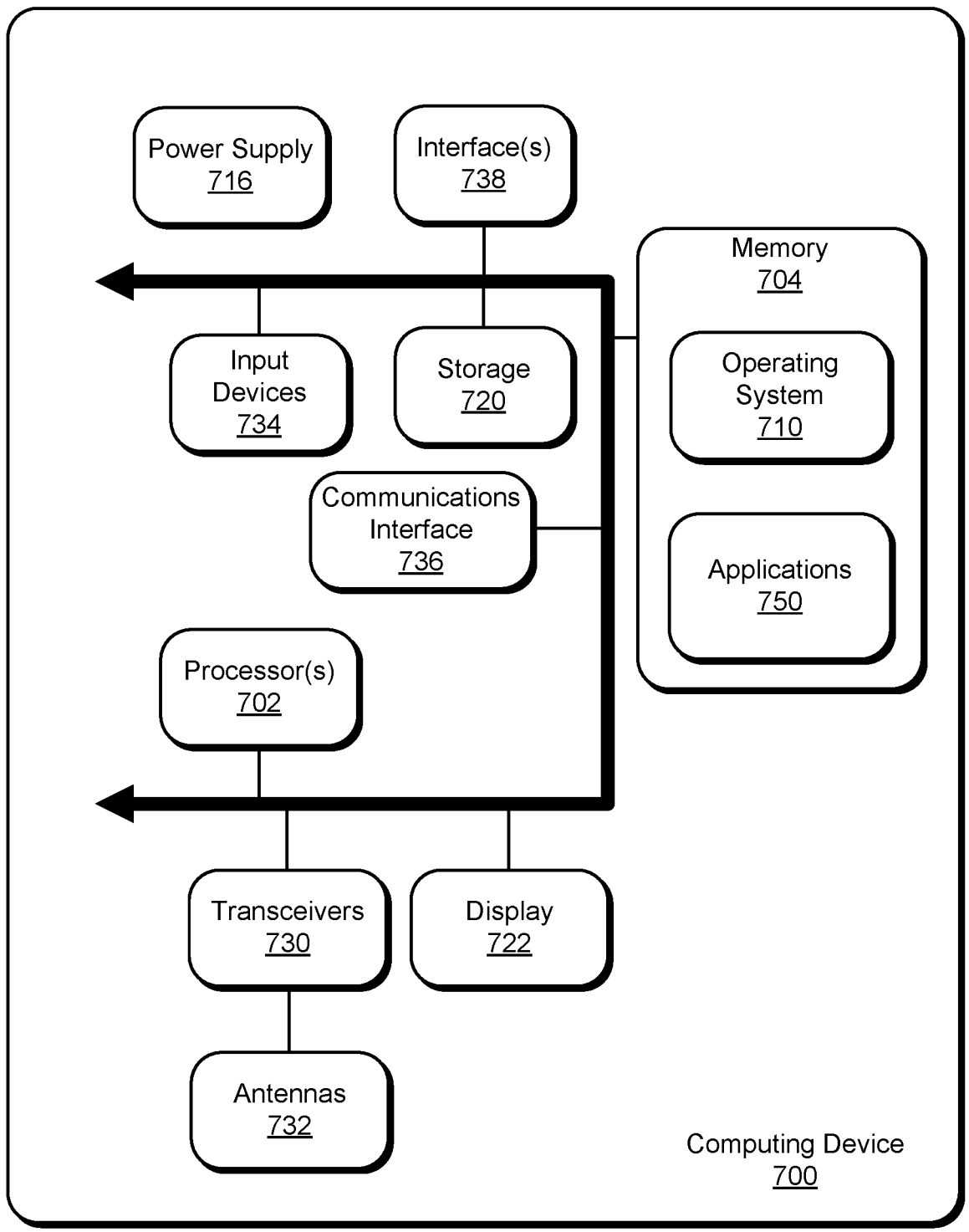
FIG. 7 illustrates an example computing device for use in implementing the described technology.

FIG. 7 illustrates an example computing device 700 for use in implementing the described technology. The computing device 700 may be a client computing device (such as a laptop computer, a desktop computer, or a tablet computer), a server/cloud computing device, an Internet-of-Things (IoT), any other type of computing device, or a combination of these options. The computing device 700 includes one or more hardware processor(s) 702 and a memory 704. The memory 704 generally includes both volatile memory (e.g., RAM) and nonvolatile memory (e.g., flash memory), although one or the other type of memory may be omitted. An operating system 710 resides in the memory 704 and is executed by the hardware processor(s) 702. In some implementations, the computing device 700 includes and/or is communicatively coupled to storage 720.

In the example computing device 700, as shown in FIG. 7, one or more modules or segments, such as applications 750, a credentials security system, one or more subsystems of a credentials security system (including a virtual security assistant subsystem, a credentials generator subsystem, a relational database subsystem, and a queue), and other program code and modules are loaded into the operating system 710 on the memory 704 and/or the storage 720 and executed by the hardware processor(s) 702. The storage 720 may store credentials, other account information, requests, authentication information, authorization information, and other data and be local to the computing device 700 or may be remote and communicatively connected to the computing device 700. In particular, in one implementation, components of a credentials security system may be implemented entirely in hardware or in a combination of hardware circuitry and software.

The computing device 700 includes a power supply 716, which may include or be connected to one or more batteries or other power sources and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers, client devices, IoT devices, and other computing and communications devices. The computing device 700 may further include a communications interface 736 (such as a network adapter or an I/O port, which are types of communication devices). The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard, trackpad, or mouse). These and other input devices may be coupled to the server by one or more interfaces 738, such as a serial port interface, parallel port, or universal serial bus (USB). The computing device 700 may further include a display 722, such as a touchscreen display.

The computing device 700 may include a variety of tangible processor-readable storage media and intangible processor-readable communication signals. Tangible processor-readable storage can be embodied by any available media that can be accessed by the computing device 700 and can include both volatile and nonvolatile storage media and removable and non-removable storage media. Tangible processor-readable storage media excludes intangible and non-transitory communications signals (such as signals per se) and includes volatile and nonvolatile, removable, and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of managing access to a specified computing system connected to a credentials security computing system via an external communication channel, the method comprising: receiving, by the credentials security computing system from a requester computing system, a request for access to the specified computing system; returning, by the credentials security computing system to the requester computing system responsive to receiving the request, credentials for an account present on the specified computing system; and modifying, by the credentials security computing system responsive to returning the credentials to the requester computing system, the account on the specified computing system.

Clause 2. The method of clause 1, further comprising: executing, by the credentials security computing system, an agent on the specified computing system, wherein the modifying operation modifies the account on the specified computing system using the agent.

Clause 3. The method of clause 1, wherein the credentials are encrypted and the modifying operation further includes: logging, responsive to detecting a decryption of the credentials, a time stamp indicating a time that the decryption of the credentials occurred; and changing, after a predetermined amount of time expires from a time associated with the time stamp, the credentials for the account at the specified computing system via the external communication channel.

Clause 4. The method of clause 1, wherein the modifying operation further includes: changing, by the credentials security computing system, the credentials for the account at the specified computing system via the external communication channel.

Clause 5. The method of clause 1, wherein the modifying operation is performed at a predesignated period of time after performing the returning operation.

Clause 6. The method of clause 1, wherein the modifying operation is performed responsive to detecting, by the credentials security computing system, a security concern.

Clause 7. The method of clause 1, wherein the specified computing system is one of multiple computing systems, and wherein the credentials are unique among credentials associated with each of the multiple computing systems.

Clause 8. The method of clause 1, wherein the modifying operation is performed responsive to receiving, by the credentials security computing system, a roll-over instruction from the requester computing system.

Clause 9. The method of clause 1, wherein the specified computing system is one of multiple computing systems, wherein performing the modifying operation includes performing the modification operation for each of the multiple computing systems, wherein performance of the modification operation for each of the multiple computing systems is triggered responsive to receiving a roll-over instruction from the requester computing system.

Clause 10. The method of clause 1, further comprising: enabling, by the credentials security computing system via the external communication channel and responsive to the request for access to the specified computing system, a user account on the specified computing system, wherein the returned credentials grant access to the enabled account.

Clause 11. The method of clause 1, wherein the modifying operation further includes: disabling, by the credentials security computing system, the account via the external communication channel.

Clause 12. A computing system for managing access to a specified computing system, the computing system comprising: a security assistant system executable by one or more hardware processors, connected to the specified computing system via an external communication channel, and configured to receive from a requester computing system, a request for access to the specified computing system and to return, to the requester computing system, credentials for an account present on the specified computing system, responsive to receiving the request; and a credentials generation system executable by the one or more hardware processors and configured to modify the account on the specified computing system, responsive to returning the credentials to the requester computing system.

Clause 13. The computing system of clause 12, wherein the security assistant system is further configured to execute an agent on the specified computing system, wherein the agent is configured to modify the account on the specified computing system.

Clause 14. The computing system of clause 12, wherein the credentials are encrypted and the modifying operation further includes: responsive to detecting a decryption of the credentials, logging a time stamp indicating a time of the decryption of the credentials; and after a predetermined amount of time expires from a time associated with the time stamp, changing the credentials for the account at the specified computing system via the external communication channel.

Clause 15. The computing system of clause 12, wherein the credentials generation system is configured to modify the account by changing the credentials for the account at the specified computing system via the external communication channel.

Clause 16. The computing system of clause 12, wherein the credentials generation system is configured to modify the account according to a schedule for a predesignated period of time after the credentials are returned.

Clause 17. The computing system of clause 12, wherein the credentials generation system is configured to modify the account responsive to detection of a security concern.

Clause 18. The computing system of clause 12, wherein the specified computing system is one of multiple specified computing systems, and the returned credentials are unique among respective credentials associated with each of the multiple specified computing systems.

Clause 19. The computing system of clause 12, wherein the credentials generation system is configured to modify the account responsive to receiving a roll-over instruction from the requester computing system.

Clause 20. The computing system of clause 12, wherein the specified computing system is one of multiple specified computing systems, and the credentials generation system is configured to modify the account on each of the multiple specified computing systems responsive to receiving a roll-over instruction from the requester computing system.

Clause 21. The computing system of clause 12, wherein the credentials generation system is configured to modify the account by enabling, via the external communication channel, a user account on the specified computing system, responsive to the request for access to the specified computing system, wherein the returned credentials grant access to the enabled account.

Clause 22. The computing system of clause 12, wherein the credentials generation system is configured to modify the account to disable the account via the external communication channel.

Clause 23. One or more tangible processor-readable storage media embodied with instructions for executing on one or more processors and circuits of a computing device a process managing access to a specified computing system connected to a credentials security system via an external communication channel, the process comprising: receiving, from a requester computing system, a request for access to the specified computing system; returning, to the requester computing system, credentials for an account present on the specified computing system, responsive to receiving the request; and modifying the account on the specified computing system, responsive to returning the credentials to the requester computing system.

Clause 24. The one or more tangible processor-readable storage media of clause 23, the process further comprising: executing an agent on the specified computing system, wherein the modifying operation modifies the account on the specified computing system using the agent.

Clause 25. The one or more tangible processor-readable storage media of clause 23, wherein the credentials are encrypted and wherein the modification operation includes: logging, responsive to detecting a decryption of the credentials, a time stamp indicating a time of the decryption of the credentials; and changing, after a predetermined amount of time expires from a time associated with the time stamp, the credentials for the account at the specified computing system via the external communication channel.

Clause 26. The one or more tangible processor-readable storage media of clause 23, wherein the modifying operation includes: changing the credentials for the account at the specified computing system via the external communication channel.

Clause 27. The one or more tangible processor-readable storage media of clause 23, wherein the modifying operation executes a predesignated period of time after performing the returning operation.

Clause 28. The one or more tangible processor-readable storage media of clause 23, wherein the modifying operation is performed responsive to detection of a security concern.

Clause 29. The one or more tangible processor-readable storage media of clause 23, wherein the specified computing system is one of multiple computing systems, and the returned credentials are unique among credentials associated with each of the multiple computing systems.

Clause 30. The one or more tangible processor-readable storage media of clause 23, wherein the modifying operation is performed responsive to issuance of a roll-over instruction from the requester computing system.

Clause 31. The one or more tangible processor-readable storage media of clause 23, wherein the specified computing system is one of multiple computing systems, and the modifying operation is triggered for each of the multiple computing systems, responsive to receiving a roll-over instruction from the requester computing system.

Clause 32. The one or more tangible processor-readable storage media of clause 23, further comprising: enabling, via the external communication channel, a user account on the specified computing system, responsive to the request for access to the specified computing system, wherein the returned credentials grant access to the enabled account.

Clause 33. The one or more tangible processor-readable storage media of clause 23, wherein the modifying operation includes: disabling the account via the external communication channel.

Clause 34. The one or more tangible processor-readable storage media of clause 23, wherein the credentials comprise one or more of user identifiers, passwords, passcodes, passkeys, one-time-passwords, biometric data, non-fungible tokens (NFTs), or other credentials.

Clause 35. A system for managing access to a specified computing system connected to a credentials security computing system via an external communication channel, the system comprising: means for receiving, by the credentials security computing system from a requester computing system, a request for access to the specified computing system; means for returning, by the credentials security computing system to the requester computing system responsive to receiving the request, credentials for an account present on the specified computing system; and means for modifying, by the credentials security computing system responsive to returning the credentials to the requester computing system, the account on the specified computing system.

Clause 36. The system of clause 35, further comprising: means for executing, by the credentials security computing system, an agent on the specified computing system, wherein the means for modifying modifies the account on the specified computing system using the agent.

Clause 37. The system of clause 35, wherein the credentials are encrypted and the means for modifying further includes: means for logging, responsive to detecting a decryption of the credentials, a time stamp indicating a time that the decryption of the credentials occurred; and changing, after a predetermined amount of time expires from a time associated with the time stamp, the credentials for the account at the specified computing system via the external communication channel.

Clause 38. The system of clause 35, wherein the means for modifying further includes: means for changing, by the credentials security computing system, the credentials for the account at the specified computing system via the external communication channel.

Clause 39. The system of clause 35, wherein the modification is performed at a predesignated period of time after the returning.

Clause 40. The system of clause 35, wherein the means for modifying operates responsive to detecting, by the credentials security computing system, a security concern.

Clause 41. The system of clause 35, wherein the specified computing system is one of multiple computing systems, and wherein the credentials are unique among credentials associated with each of the multiple computing systems.

Clause 42. The system of clause 35, wherein the means for modifying operates responsive to receiving, by the credentials security computing system, a roll-over instruction from the requester computing system.

Clause 43. The system of clause 35, wherein the specified computing system is one of multiple computing systems, wherein means for modifying includes means for modifying each of the multiple computing systems, wherein means for modifying each of the multiple computing systems is triggered responsive to receiving a roll-over instruction from the requester computing system.

Clause 44. The system of clause 35, further comprising: means for enabling, by the credentials security computing system via the external communication channel and responsive to the request for access to the specified computing system, a user account on the specified computing system, wherein the returned credentials grant access to the enabled account.

Clause 45. The system of clause 35, wherein the modifying operation further includes: disabling, by the credentials security computing system, the account via the external communication channel.

Some implementations may include an article of manufacture, which excludes software per se. An article of manufacture may include a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of managing access to a specified computing system connected to a credentials security computing system via an external communication channel, the method comprising:
   receiving, by the credentials security computing system from a requester computing system, a request for access to the specified computing system, wherein the requester computing system is logically and physically distinct from the credentials security computing system and the specified computing system;
   returning, by the credentials security computing system to the requester computing system responsive to receiving the request, credentials for an account present on the specified computing system; and
   modifying, by the credentials security computing system responsive to returning the credentials to the requester computing system, the account on the specified computing system.

2. The method of claim 1, further comprising:
   executing, by the credentials security computing system, an agent on the specified computing system, wherein the modifying operation modifies the account on the specified computing system using the agent.

3. The method of claim 1, wherein the credentials are encrypted and the modifying operation further includes:
   logging, responsive to detecting a decryption of the credentials, a time stamp indicating a time that the decryption of the credentials occurred; and
   changing, after a predetermined amount of time expires from a time associated with the time stamp, the credentials for the account at the specified computing system via the external communication channel.

4. The method of claim 1, wherein the modifying operation further includes:
   changing, by the credentials security computing system, the credentials for the account at the specified computing system via the external communication channel.

5. The method of claim 1, wherein the modifying operation is performed at a predesignated period of time after performing the returning operation.

6. The method of claim 1, wherein the modifying operation is performed responsive to detecting, by the credentials security computing system, a security concern.

7. The method of claim 1, wherein the specified computing system is one of multiple computing systems, and wherein the credentials are unique among credentials associated with each of the multiple computing systems.

8. The method of claim 1, wherein the modifying operation is performed responsive to receiving, by the credentials security computing system, a roll-over instruction from the requester computing system.

9. The method of claim 1, wherein the specified computing system is one of multiple computing systems, wherein performing the modifying operation includes performing the modifying operation for each of the multiple computing systems, wherein performance of the modifying operation for each of the multiple computing systems is triggered responsive to receiving a roll-over instruction from the requester computing system.

10. The method of claim 1, further comprising:
    enabling, by the credentials security computing system via the external communication channel and responsive to the request for access to the specified computing system, a user account on the specified computing system, wherein the returned credentials grant access to the enabled account.

11. The method of claim 1, wherein the modifying operation further includes:
    disabling, by the credentials security computing system, the account via the external communication channel.

12. The method of claim 1, wherein the request for access to the specified computing system is received from the requester computing system via a communications network.

13. A computing system for managing access to a specified computing system, the computing system comprising:
    a security assistant system executable by one or more hardware processors, connected to the specified computing system via an external communication channel, and configured to receive from a requester computing system, a request for access to the specified computing system and to return, to the requester computing system, credentials for an account present on the specified computing system, responsive to receiving the request, wherein the requester computing system is logically and physically distinct from the computing system and the specified computing system; and a credentials generation system executable by the one or more hardware processors and configured to modify the account on the specified computing system, responsive to returning the credentials to the requester computing system.

14. The computing system of claim 13, wherein the security assistant system is further configured to execute an agent on the specified computing system, wherein the agent is configured to modify the account on the specified computing system.

15. The computing system of claim 13, wherein the credentials are encrypted and the modifying operation further includes:
    responsive to detecting a decryption of the credentials, logging a time stamp indicating a time of the decryption of the credentials; and after a predetermined amount of time expires from a time associated with the time stamp, changing the credentials for the account at the specified computing system via the external communication channel.

16. The computing system of claim 13, wherein the credentials generation system is configured to modify the account by changing the credentials for the account at the specified computing system via the external communication channel.

17. The computing system of claim 13, wherein the credentials generation system is configured to modify the account according to a schedule for a predesignated period of time after the credentials are returned.

18. The computing system of claim 13, wherein the credentials generation system is configured to modify the account responsive to detection of a security concern.

19. The computing system of claim 13, wherein the specified computing system is one of multiple specified computing systems, and the returned credentials are unique among respective credentials associated with each of the multiple specified computing systems.

20. The computing system of claim 13, wherein the credentials generation system is configured to modify the account responsive to receiving a roll-over instruction from the requester computing system.

21. The computing system of claim 13, wherein the specified computing system is one of multiple specified computing systems, and the credentials generation system is configured to modify the account on each of the multiple specified computing systems responsive to receiving a roll-over instruction from the requester computing system.

22. The computing system of claim 13, wherein the credentials generation system is configured to modify the account by enabling, via the external communication channel, a user account on the specified computing system, responsive to the request for access to the specified computing system, wherein the returned credentials grant access to the enabled account.

23. The computing system of claim 13, wherein the credentials generation system is configured to modify the account to disable the account via the external communication channel.

24. One or more tangible processor-readable storage media embodied with instructions for executing on one or more processors and circuits of a computing device a process of managing access to a specified computing system connected to a credentials security system via an external communication channel, the process comprising:
receiving, from a requester computing system, a request for access to the specified computing system, wherein the requester computing system is logically and physically distinct from the computing device and the specified computing system;
returning, to the requester computing system, credentials for an account present on the specified computing system, responsive to receiving the request;
and modifying the account on the specified computing system, responsive to returning the credentials to the requester computing system.

25. The one or more tangible processor-readable storage media of claim 24, the process further comprising:
executing an agent on the specified computing system, wherein the modifying operation modifies the account on the specified computing system using the agent.

26. The one or more tangible processor-readable storage media of claim 24, wherein the credentials are encrypted and wherein the modifying operation includes:
logging, responsive to detecting a decryption of the credentials, a time stamp indicating a time of the decryption of the credentials; and
changing, after a predetermined amount of time expires from a time associated with the time stamp, the credentials for the account at the specified computing system via the external communication channel.

27. The one or more tangible processor-readable storage media of claim 24, wherein the modifying operation includes:
changing the credentials for the account at the specified computing system via the external communication channel.

28. The one or more tangible processor-readable storage media of claim 24, wherein the modifying operation executes a predesignated period of time after performing the returning operation.

29. The one or more tangible processor-readable storage media of claim 24, wherein the modifying operation is performed responsive to detection of a security concern.

30. The one or more tangible processor-readable storage media of claim 24, wherein the specified computing system is one of multiple computing systems, and the returned credentials are unique among credentials associated with each of the multiple computing systems.

31. The one or more tangible processor-readable storage media of claim 24, wherein the modifying operation is performed responsive to issuance of a roll-over instruction from the requester computing system.

32. The one or more tangible processor-readable storage media of claim 24, wherein the specified computing system is one of multiple computing systems, and the modifying operation is triggered for each of the multiple computing systems, responsive to receiving a roll-over instruction from the requester computing system.

33. The one or more tangible processor-readable storage media of claim 24, further comprising:
enabling, via the external communication channel, a user account on the specified computing system, responsive to the request for access to the specified computing system, wherein the returned credentials grant access to the enabled account.

34. The one or more tangible processor-readable storage media of claim 24, wherein the modifying operation includes:
disabling the account via the external communication channel.

35. The one or more tangible processor-readable storage media of claim 24, wherein the credentials comprise one or more of user identifiers, passwords, passcodes, passkeys, one-time-passwords, biometric data, non-fungible tokens (NFTs), or other credentials.

* * * * *